(12) United States Patent
Tian

(10) Patent No.: US 9,723,368 B2
(45) Date of Patent: Aug. 1, 2017

(54) METHOD, DEVICE AND SYSTEM AND FOR PLAY SYNCHRONIZATION CONTROL IN VIDEO RECOMMENDATION SERVICE

(71) Applicant: ZTE CORPORATION, Shenzhen, Guangdong Province (CN)

(72) Inventor: Chengping Tian, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 21 days.

(21) Appl. No.: 14/424,513

(22) PCT Filed: Aug. 1, 2013

(86) PCT No.: PCT/CN2013/080637
§ 371 (c)(1),
(2) Date: Feb. 27, 2015

(87) PCT Pub. No.: WO2013/178190
PCT Pub. Date: Dec. 5, 2013

(65) Prior Publication Data
US 2015/0245106 A1    Aug. 27, 2015

(30) Foreign Application Priority Data

Aug. 27, 2012 (CN) .......................... 2012 1 0308056

(51) Int. Cl.
*H04N 21/482* (2011.01)
*H04N 21/242* (2011.01)
(Continued)

(52) U.S. Cl.
CPC ....... *H04N 21/4826* (2013.01); *H04N 21/242* (2013.01); *H04N 21/2407* (2013.01);
(Continued)

(58) Field of Classification Search
CPC ............. H04N 21/242; H04N 21/4788; H04N 21/4305; H04N 21/27; H04N 21/4302;
(Continued)

(56) References Cited

U.S. PATENT DOCUMENTS

| | | | |
|---|---|---|---|
| 7,716,376 B1 * | 5/2010 | Price | G06F 1/12 709/248 |
| 2004/0252400 A1 | 12/2004 | Blank et al. | |

(Continued)

FOREIGN PATENT DOCUMENTS

| | | |
|---|---|---|
| CN | 101262494 A | 9/2008 |
| CN | 101964842 A | 2/2011 |

(Continued)

*Primary Examiner* — Hai V Tran
(74) *Attorney, Agent, or Firm* — Ling Wu; Stephen Yang; Ling and Yang Intellectual Property

(57) ABSTRACT

The embodiment of the document discloses a method for play synchronization control in a video recommendation service, comprising a synchronization server receiving play progress information reported in real time by a controlling party terminal and controlled party terminal during a play process of a recommended video; the synchronization server calculating according to play progress information reported by the controlling party terminal to obtain a current play time point for the recommended video of the controlling party terminal, and sending the play progress information containing a current video play time point for the recommended video of the controlling party terminal to the controlled party terminal; the controlled party terminal calculating according to the play progress information to obtain the current play progress of the controlling party terminal, and adjusting the play progress of the recommended video to be consistent with the current play progress of the controlling party.

13 Claims, 2 Drawing Sheets

(51) Int. Cl.
  *H04N 21/8547* (2011.01)
  *H04N 21/43* (2011.01)
  *H04N 21/432* (2011.01)
  *H04N 21/4788* (2011.01)
  *H04N 21/61* (2011.01)
  *H04N 21/24* (2011.01)
  *H04N 21/25* (2011.01)
  *H04N 21/44* (2011.01)
  *H04N 21/466* (2011.01)
  *H04N 21/643* (2011.01)

(52) U.S. Cl.
  CPC ....... *H04N 21/251* (2013.01); *H04N 21/4302* (2013.01); *H04N 21/4305* (2013.01); *H04N 21/4325* (2013.01); *H04N 21/44008* (2013.01); *H04N 21/4668* (2013.01); *H04N 21/4788* (2013.01); *H04N 21/6125* (2013.01); *H04N 21/64322* (2013.01); *H04N 21/8547* (2013.01)

(58) Field of Classification Search
  CPC ........... H04N 21/8455; H04N 21/8547; H04N 7/157; H04N 21/4826; H04N 21/4325; H04N 21/251; H04N 21/6125; H04N 21/4408; H04N 21/64322; G06F 1/12
  See application file for complete search history.

(56) References Cited

U.S. PATENT DOCUMENTS

| | | | |
|---|---|---|---|
| 2006/0085823 | A1 | 4/2006 | Bell et al. |
| 2006/0236352 | A1* | 10/2006 | Scott, III ........... H04N 21/4788 725/80 |
| 2008/0059580 | A1* | 3/2008 | Kalinowski .......... G06Q 10/107 709/204 |
| 2009/0217329 | A1 | 8/2009 | Riedl et al. |
| 2011/0246908 | A1* | 10/2011 | Akram ........... H04N 21/234318 709/231 |
| 2012/0131110 | A1 | 5/2012 | Buyukkoc et al. |
| 2012/0144435 | A1* | 6/2012 | Spilo ................... H04N 21/4305 725/78 |
| 2012/0311043 | A1* | 12/2012 | Chen ................ H04N 21/23406 709/204 |
| 2013/0173742 | A1* | 7/2013 | Thomas .............. H04N 21/242 709/217 |

FOREIGN PATENT DOCUMENTS

| | | |
|---|---|---|
| CN | 102447693 A | 5/2012 |
| WO | 2009113740 A1 | 9/2009 |

\* cited by examiner

METHOD, DEVICE AND SYSTEM AND FOR PLAY SYNCHRONIZATION CONTROL IN VIDEO RECOMMENDATION SERVICE

TECHNICAL FIELD

The embodiment of the present document relates to the internet protocol television (IPTV) technology, and in particular, to a method, apparatus and system for play synchronization control in a video recommendation service.

BACKGROUND

IPTV is a video media service business, with the constant improvement of the technology and the deep development of the business, the number of its users is increasing continuously, and the IPTV technology is developing constantly too. The good friend recommendation function emerges under the situation for improving user interaction. In the good friend recommendation function, user can push the information about the video content that is being watched to other good friend users through the IPTV system, and other good friend users watch the video directly through the push message sent by the system in a situation of possessing the video content watching authority.

The indexes and navigations of various services provided by the IPTV are all completed by the electronic program guide (EPG) system. The interface of the IPTV EPG system is similar to the Web page, and the components, such as all kinds of menus, buttons, links, etc., available for users to click directly when selecting programs are generally provided on the EPG system interface; and the interface of the EPG system can further contain all kinds of dynamic or static media content for the users to browse.

At present, in the good friend recommendation function of the IPTV, when the recommended users watch the video content recommended by the recommending users, they can only watch from the time point recommended by the recommending users. If the time consuming in the push process of the video content is too long, the synchronization push of the video content between the recommended users and the recommending users cannot be guaranteed, which can not cause that the recommended users and the recommending users watch synchronously. Especially when the recommending users perform the video control (for example, forward, backward, etc.), the recommended users cannot perform the real time synchronization operation, which makes the push of the video contents between the recommended users and the recommending users be out of sync, and causes that the recommended users and the recommending users cannot watch synchronously.

SUMMARY

In view of this, the main purpose of the embodiment of the present document is to provide a method, apparatus and system for play synchronization control in a video recommendation service, so as to solve the problem that the synchronization play control of the video content between the recommended user and the recommending user in the existing IPTV good friend recommendation function cannot be realized.

In order to achieve the above-mentioned purpose, the technical scheme of the embodiment of the present document is realized in the following way.

The embodiment of the present document provides a method for play synchronization control in a video recommendation service, comprising:

a synchronization server receiving play progress information reported in real time by a controlling party terminal and a controlled party terminal during a play process of a recommended video; wherein, the play progress information comprises a system timestamp configured to identify a system time when the play progress information is sent;

the synchronization server calculating according to the play progress information reported by the controlling party terminal to obtain a current play time point for the recommended video of the controlling party terminal, and sending the play progress information which contains a current video play time point for the recommended video of the controlling party terminal to the controlled party terminal.

In the above-mentioned scheme, before the synchronization server receiving play progress information reported in real time by a controlling party terminal and a controlled party terminal during a play process of a recommended video, the method further comprises: the synchronization server establishing a synchronization group including the controlling party terminal and the controlled party terminal, and sending information about the synchronization group to the controlling party terminal and the controlled party terminal.

In the above-mentioned scheme, the synchronization server sends the play progress information which contains the current video play time point of the controlling party terminal to the controlled party terminal in the following way: the synchronization server sending the play progress information which contains the current video play time point of the controlling party terminal to the controlled party terminal when determining that a play error between the controlling party terminal and the controlled party terminal exceeds a preset synchronization play control threshold value according to the play progress information reported in real time by the controlling party terminal and the controlled party terminal.

In the above-mentioned scheme, processing that the synchronization server determines that a play error between the controlling party terminal and the controlled party terminal exceeds a preset synchronization play control threshold value according to the play progress information reported in real time by the controlling party terminal and the controlled party terminal comprises:

calculating according to the play progress information reported by the controlling party terminal to obtain the current play time point for the recommended video of the controlling party terminal;

calculating according to the play progress information reported by the controlled party terminal to obtain the current play time point for the recommended video of the controlled party terminal;

obtaining the play error between the controlling party terminal and the controlled party terminal from the error between the current play time point for the recommended video of the controlling party terminal and the current play time point for the recommended video of the controlled party terminal; and comparing the play error between the controlling party terminal and the controlled party terminal with the preset synchronization play control threshold value, judging whether the play error between the controlling party terminal and the controlled party terminal exceeds the preset synchronization play control threshold value.

In the above-mentioned scheme, the play progress information comprises: an identification of the recommended video, a video play time point, a synchronization group identification and a system timestamp; wherein, the video play time point is configured to identify the current play time point of the recommended video when the controlling party terminal or the controlled party terminal reports the play progress information, or configured to identify the current play time point for the recommended video of the controlling party terminal when the play progress information is sent to the controlled party terminal; and the system timestamp is configured to identify the system time when the play progress information is sent.

The embodiment of the present document further provides a method for play synchronization control in a video recommendation service, comprising: a controlled party terminal receiving play progress information sent by a synchronization server, calculating according to the play progress information to obtain a current play progress of a controlling party terminal, and adjusting a play progress of a recommended video to be consistent with a current play progress of the controlling party.

In the above-mentioned scheme, the controlled party terminal calculating according to the play progress information to obtain a current play progress of a controlling party terminal and adjusting a play progress of a recommended video to be consistent with a current play progress of the controlling party comprises: the controlled party terminal calculating, according to a video play time point and a system timestamp in the play progress information, to obtain the current play time point for the recommended video of the controlling party terminal, and adjusting a local play progress of the recommended video to the current play time point for the recommended video of the controlling party terminal.

The embodiment of the present document further provides a method for play synchronization control in a video recommendation service, comprising: a controlling party terminal reporting in real time play progress information to a synchronization server during a play process of a recommended video, wherein, the play progress information comprises a system timestamp configured to identify a system time when the play progress information is sent.

In the above-mentioned scheme, before the controlling party terminal reports in real time the play progress information to the synchronization server, further comprising: the controlling party terminal receiving information about a synchronization group sent by the synchronization server after the synchronization server establishing the synchronization group which contains the controlling party terminal and a controlled party terminal, sending a video recommendation request to the controlled party terminal, and carrying the information about the synchronization group in the video recommendation request.

The embodiment of the present document further provides a synchronization server configured for play synchronization control in a video recommendation service, comprising: a receiving unit and a sending unit; wherein, the receiving unit is configured to: receive play progress information reported in real time by a controlling party terminal and a controlled party terminal during a play process of a recommended video; wherein the play progress information comprises a system timestamp configured to identify a system time when the play progress information is sent; and the sending unit is configured to: calculating according to the play progress information of the controlling party terminal to obtain a current play time point for the recommended video of the controlling party terminal, and send the play progress information which contains the current video play time point for the recommended video of the controlling party terminal to the controlled party terminal.

In the above-mentioned scheme, the play progress information comprises: an identification of the recommended video, a video play time point, a synchronization group identification and a system timestamp; wherein, the video play time point is configured to identify the current play time point of the recommended video when the controlling party terminal or the controlled party terminal reports the play progress information, or configured to identify the current play time point for the recommended video of the controlling party terminal when the play progress information is sent to the controlled party terminal; and the system timestamp is configured to identify the system time when the play progress information is sent.

In the above-mentioned scheme, the synchronization server further comprises: a judgment unit, configured to: notify the sending unit when determining that a play error between the controlling party terminal and the controlled party terminal exceeds a preset synchronization play control threshold value according to the play progress information reported in real time by the controlling party terminal and the controlled party terminal; and the sending unit, configured to calculate according to the play progress information of the controlling party terminal to obtain the current play time point for the recommended video of the controlling party terminal when a notification is received from the judgment unit, and send the play progress information which contains the current video play time point for the recommended video of the controlling party terminal to the controlled party terminal.

In the above-mentioned scheme, the judgment unit is configured to:

calculate according to the play progress information of the controlling party terminal received by the receiving unit to obtain the current play time point for the recommended video of the controlling party terminal;

calculate according to the play progress information of the controlled party terminal received by the receiving unit to obtain the current play time point for the recommended video of the controlled party terminal;

obtain the play error between the controlling party terminal and the controlled party terminal from difference between the current play time point for the recommended video of the controlling party terminal and the current play time point for the recommended video of the controlled party terminal; and compare the play error between the controlling party terminal and the controlled party terminal with the preset synchronization play control threshold value, to judge whether the play error between the controlling party terminal and the controlled party terminal exceeds the preset synchronization play control threshold value.

In the above-mentioned scheme, the synchronization server further comprises: an establishment unit, configured to: establish a synchronization group including the controlling party terminal and the controlled party terminal, and send information about the synchronization group to the controlling party terminal and the controlled party terminal.

The embodiment of the present document further provides a controlled party terminal configured for play synchronization control in a video recommendation service, configured to: report in real time play progress information comprising a system timestamp configured to identify a system time when the play progress information is sent to a synchronization server during a play process of a recommended video; and configured to: receive play progress information sent by the synchronization server, calculate according to the play progress information to obtain a current play progress of the controlling party terminal, and adjust a play progress of the recommended video to be consistent with a current play progress of the controlling party.

In the above-mentioned scheme, the play progress information comprises: an identification of the recommended video, a video play time point, a synchronization group identification and a system timestamp; wherein, the video play time point is configured to identify the current play time point of the recommended video when the controlling party terminal or the controlled party terminal reports the play progress information, or configured to identify the current play time point for the recommended video of the controlling party terminal when sending the play progress information to the controlled party terminal; and the system timestamp is configured to identify the system time when the play progress information is sent.

The embodiment of the present document further provides a controlling party terminal configured for play synchronization control in a video recommendation service, configured to: report play progress information in real time to a synchronization server during a play process of a recommended video, wherein, the play progress information comprises a system timestamp, configured to identify a system time when the play progress information is sent.

In the above-mentioned scheme, the play progress information comprises: an identification of the recommended video, a video play time point, a synchronization group identification and a system timestamp; wherein, the video play time point is configured to identify the current play time point of the recommended video when the controlling party terminal or the controlled party terminal reports the play progress information, or configured to identify the current play time point for the recommended video of the controlling party terminal when the play progress information is sent to the controlled party terminal; and the system timestamp is configured to identify the system time when the play progress information is sent.

In the above-mentioned scheme, the controlling party terminal is further configured to receive information about a synchronization group sent by the synchronization server after the synchronization server establishes the synchronization group which contains the controlling party terminal and the controlled party terminal, send a video recommendation request to the controlled party terminal, and carry the information about the synchronization group in the video recommendation request.

The embodiment of the present document further provides a system for play synchronization control in a video recommendation service, comprising: a controlling party terminal, a controlled party terminal and a synchronization server, wherein, the synchronization server comprises a receiving unit and a sending unit; wherein, the receiving unit is configured to: receive play progress information reported in real time by a controlling party terminal and a controlled party terminal during a play process of a recommended video; wherein the play progress information comprises a system timestamp configured to identify a system time when the play progress information is sent; and the sending unit is configured to: calculate according to the play progress information of the controlling party terminal to obtain a current play time point for the recommended video of the controlling party terminal, and send the play progress information which contains the current video play time point for the recommended video of the controlling party terminal to the controlled party terminal;

the controlling party terminal is configured to: report play progress information in real time to a synchronization server during a play process of a recommended video; and the controlled party terminal is configured to: report play progress information in real time to a synchronization server during a play process of a recommended video; and configured to: receive play progress information sent by the synchronization server, calculate according to the play progress information to obtain a current play progress of the controlling party terminal, and adjust a play progress of the recommended video to be consistent with the current play progress of the controlling party.

In the above-mentioned scheme, the synchronization server further comprises: an establishment unit, configured to: establish a synchronization group including the controlling party terminal and the controlled party terminal, and send information about the synchronization group to the controlling party terminal and the controlled party terminal; and the controlling party terminal is further configured to send a video recommendation request to the controlled party terminal, and carry the information about the synchronization group in the video recommendation request.

In the above-mentioned scheme, the controlled party terminal is configured to, calculate, according to a video play time point and a system timestamp in the play progress information, to obtain the current play time point for the recommended video of the controlling party terminal, and adjust a local play progress of the recommended video to the current play time point for the recommended video of the controlling party terminal.

In the above-mentioned scheme, the play progress information comprises: an identification of the recommended video, a video play time point, a synchronization group identification and a system timestamp; wherein, the video play time point is configured to identify the current play time point of the recommended video when the controlling party terminal or the controlled party terminal reports the play progress information, or configured to identify the current play time point for the recommended video of the controlling party terminal when the play progress information is sent to the controlled party terminal; and the system timestamp is configured to identify the system time when the play progress information is sent.

In the above-mentioned scheme, the synchronization server further comprises: a judgment unit, configured to: notify the sending unit when determining that a play error between the controlling party terminal and the controlled party terminal exceeds a preset synchronization play control threshold value according to the play progress information reported in real time by the controlling party terminal and the controlled party terminal; and the sending unit is configured to calculate according to the play progress information of the controlling party terminal to obtain the current play time point for the recommended video of the controlling party terminal when a notification of a judgment unit is received, and send the play progress information which contains the current video play time point for the recommended video of the controlling party terminal to the controlled party terminal.

In the above-mentioned scheme, the judgment unit is configured to:

calculate according to the play progress information of the controlling party terminal received by the receiving unit to obtain the current play time point for the recommended video of the controlling party terminal;

calculate according to the play progress information of the controlled party terminal received by the receiving unit to obtain the current play time point for the recommended video of the controlled party terminal;

obtain the play error between the controlling party terminal and the controlled party terminal from a difference between the current play time point for the recommended video of the controlling party terminal and the current play time point for the recommended video of the controlled party terminal; and compare the play error between the controlling party terminal and the controlled party terminal with the preset synchronization play control threshold value, judging whether the play error between the controlling party terminal and the controlled party terminal exceeds the preset synchronization play control threshold value.

In the method, apparatus and system for play synchronization control in the video recommendation service in the embodiment of the present document, the play progress information of the controlling party terminal and the controlled party terminal is obtained in real time, calculation is made according to the play progress information reported by the controlling party terminal to obtain a current play time point for the recommended video of the controlling party terminal, and the play progress information which contains a current video play time point for the recommended video of the controlling party terminal is sent to the controlled party terminal; a controlled party terminal receives play progress information sent by a synchronization server, calculates according to the play progress information to obtain a current play progress of a controlling party terminal, and adjusts the play progress of the recommended video to be consistent with the current play progress of the controlling party; during the reported and sent progress information, a system timestamp is added, the influence on the play synchronization precision caused by the network delay is reduced in the reporting and sending processes, and it makes the controlled party terminal obtain in real time the current play time point of the controlling party terminal and perform the precise play progress adjustment, to solve the problem that the synchronization play control of the video content between the recommended user and the recommending user cannot be realized in the existing IPTV good friend recommendation function, so as to enable the recommending user and the recommended user watch the same video content synchronously.

PREFERRED EMBODIMENTS OF THE PRESENT DOCUMENT

Figure 1:
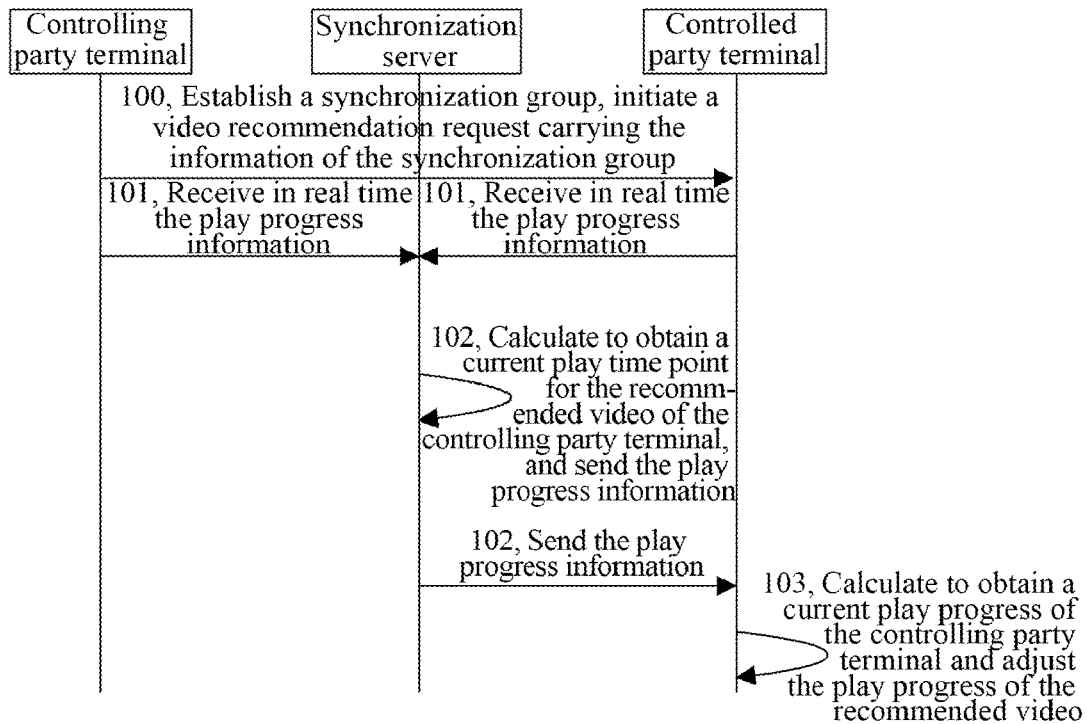
FIG. 1 is a realization diagram of a method for play synchronization control in a video recommendation service according to an embodiment of the present document.

As shown in FIG. 1, the method for the play synchronization control in the video recommendation service of the embodiment of the present document mainly can include the following steps.

In step 101, a synchronization server receives play progress information reported in real time by a controlling party terminal and a controlled party terminal during a play process of a recommended video; wherein, the play progress information comprises a system timestamp configured to identify a system time when the play progress information is sent.

In step 102, the synchronization server calculates according to the play progress information reported by the controlling party terminal to obtain a current play time point for the recommended video of the controlling party terminal, and sends the play progress information which contains a current video play time point for the recommended video of the controlling party terminal to the controlled party terminal.

Herein, if the synchronization server determines that a play error between the controlling party terminal and the controlled party terminal exceeds a preset synchronization play control threshold value according to the play progress information reported in real time by the controlling party terminal and the controlled party terminal, then the synchronization server sends the play progress information which contains the current video play time point of the controlling party terminal to the controlled party terminal.

Specifically, a calculation is conducted according to the play progress information reported by the controlling party terminal to obtain the current play time point for the recommended video of the controlling party terminal; a calculation is conducted according to the play progress information reported by the controlled party terminal to obtain the current play time point for the recommended video of the controlled party terminal; the play error between the controlling party terminal and the controlled party terminal is obtained from the error between the current play time point for the recommended video of the controlling party terminal and the current play time point for the recommended video of the controlled party terminal; and the play error between the controlling party terminal and the controlled party terminal is compared with the preset synchronization play control threshold value, to judge whether the play error between the controlling party terminal and the controlled party terminal exceeds the preset synchronization play control threshold value.

In step 103, a controlled party terminal receives play progress information sent by a synchronization server, calculates according to the play progress information to obtain a current play progress of a controlling party terminal, and adjusts a play progress of a recommended video to be consistent with a current play progress of the controlling party.

Specifically, the controlled party terminal calculates, according to a video play time point and a system timestamp in the play progress information, to obtain the current play time point for the recommended video of the controlling party terminal, and adjusts a local play progress of the recommended video to the current play time point for the recommended video of the controlling party terminal.

Here, before step 101, the method can further include the following step.

In step 100, the controlling party terminal establishes a synchronization group including the controlling party terminal and the controlled party terminal, sends a video recommendation request to the controlled party terminal, and carries information about the synchronization group in the video recommendation request.

Correspondingly, the embodiment of the present document further provides a synchronization server for play synchronization control in a video recommendation service, including: a receiving unit and a sending unit; wherein, the receiving unit is configured to: receive play progress information reported in real time by a controlling party terminal and a controlled party terminal during a play process of a recommended video, wherein the play progress information comprises a system timestamp configured to identify a system time when the play progress information is sent; and the sending unit is configured to: calculate according to the play progress information of the controlling party terminal to obtain a current play time point for the recommended video of the controlling party terminal, and send the play progress information which contains the current video play time point for the recommended video of the controlling party terminal to the controlled party terminal.

The synchronization server further includes: a judgment unit, configured to: notify the sending unit when determining that a play error between the controlling party terminal and the controlled party terminal exceeds a preset synchronization play control threshold value according to the play progress information reported in real time by the controlling party terminal and the controlled party terminal; and the sending unit, configured to calculate according to the play progress information of the controlling party terminal to obtain the current play time point for the recommended video of the controlling party terminal when a notification is received from the judgment unit, and send the play progress information which contains the current video play time point for the recommended video of the controlling party terminal to the controlled party terminal.

Specifically, the judgment unit is configured to: calculate according to the play progress information of the controlling party terminal received by the receiving unit to obtain the current play time point for the recommended video of the controlling party terminal; calculate according to the play progress information of the controlled party terminal received by the receiving unit to obtain the current play time point for the recommended video of the controlled party terminal; obtain the play error between the controlling party terminal and the controlled party terminal from difference between the current play time point for the recommended video of the controlling party terminal and the current play time point for the recommended video of the controlled party terminal; and compare the play error between the controlling party terminal and the controlled party terminal with the preset synchronization play control threshold value, to judge whether the play error between the controlling party terminal and the controlled party terminal exceeds the preset synchronization play control threshold value.

Correspondingly, the embodiment of the present document further provides a controlled party terminal configured for play synchronization control in a video recommendation service, configured to: report in real time play progress information comprising a system timestamp configured to identify a system time when the play progress information is sent to a synchronization server during a play process of a recommended video; and configured to: receive play progress information sent by the synchronization server, calculate according to the play progress information to obtain a current play progress of the controlling party terminal, and adjust a play progress of the recommended video to be consistent with a current play progress of the controlling party.

Correspondingly, the embodiment of the present document further provides a controlling party terminal configured for play synchronization control in a video recommendation service, configured to: report play progress information in real time to a synchronization server during a play process of a recommended video, wherein, the play progress information comprises a system timestamp configured to identify a system time when the play progress information is sent.

Here, the controlling party terminal is further configured to receive information about a synchronization group sent by the synchronization server after the synchronization server establishes the synchronization group which contains the controlling party terminal and the controlled party terminal, send a video recommendation request to the controlled party terminal, and carry the information about the synchronization group in the video recommendation request.

Correspondingly, the embodiment of the present document further provides a system for play synchronization control in a video recommendation service, including the above-mentioned controlling party terminal, the above-mentioned controlled party terminal and the above-mentioned synchronization server.

Here, the controlled party terminal is configured to, calculate, according to a video play time point and a system timestamp in the play progress information, to obtain the current play time point for the recommended video of the controlling party terminal, and adjust a local play progress of the recommended video to the current play time point for the recommended video of the controlling party terminal.

The play progress information in the embodiment of the present document can include: an identification of the recommended video, a video play time point, a synchronization group identification and a system timestamp; wherein, the video play time point is configured to identify the current play time point of the recommended video when the controlling party terminal or the controlled party terminal reports the play progress information, or configured to identify the current play time point for the recommended video of the controlling party terminal when the play progress information is sent to the controlled party terminal; and the system timestamp is configured to identify the system time when the play progress information is sent.

Embodiment One

Figure 2:
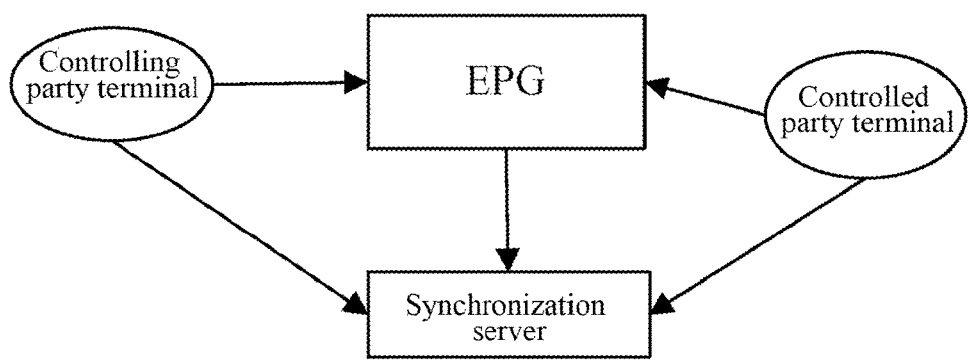
FIG. 2 is a composition structure diagram of a system for play synchronization control in a video recommendation service according to an embodiment of the present document.

The present embodiment provides a play synchronization control system in a video recommendation service, and its composition structure is as shown in FIG. 2, which can mainly include a controlling party terminal, a controlled party terminal, an EPG device and a synchronization server. Wherein, both the controlling party terminal and the controlled party terminal log on the IPTV system through the EPG device, the controlling party terminal is configured to initiate a video recommendation request when playing a video, the controlled party terminal is configured to play the video recommended by the controlling party terminal when receiving the video recommendation request; and the synchronization server is configured to control the synchronized play of the recommended video between the controlling party terminal and the controlled party terminal, which makes the progress of playing the recommended video by the controlling party terminal to be consistent with that of the controlled party terminal.

Figure 3:
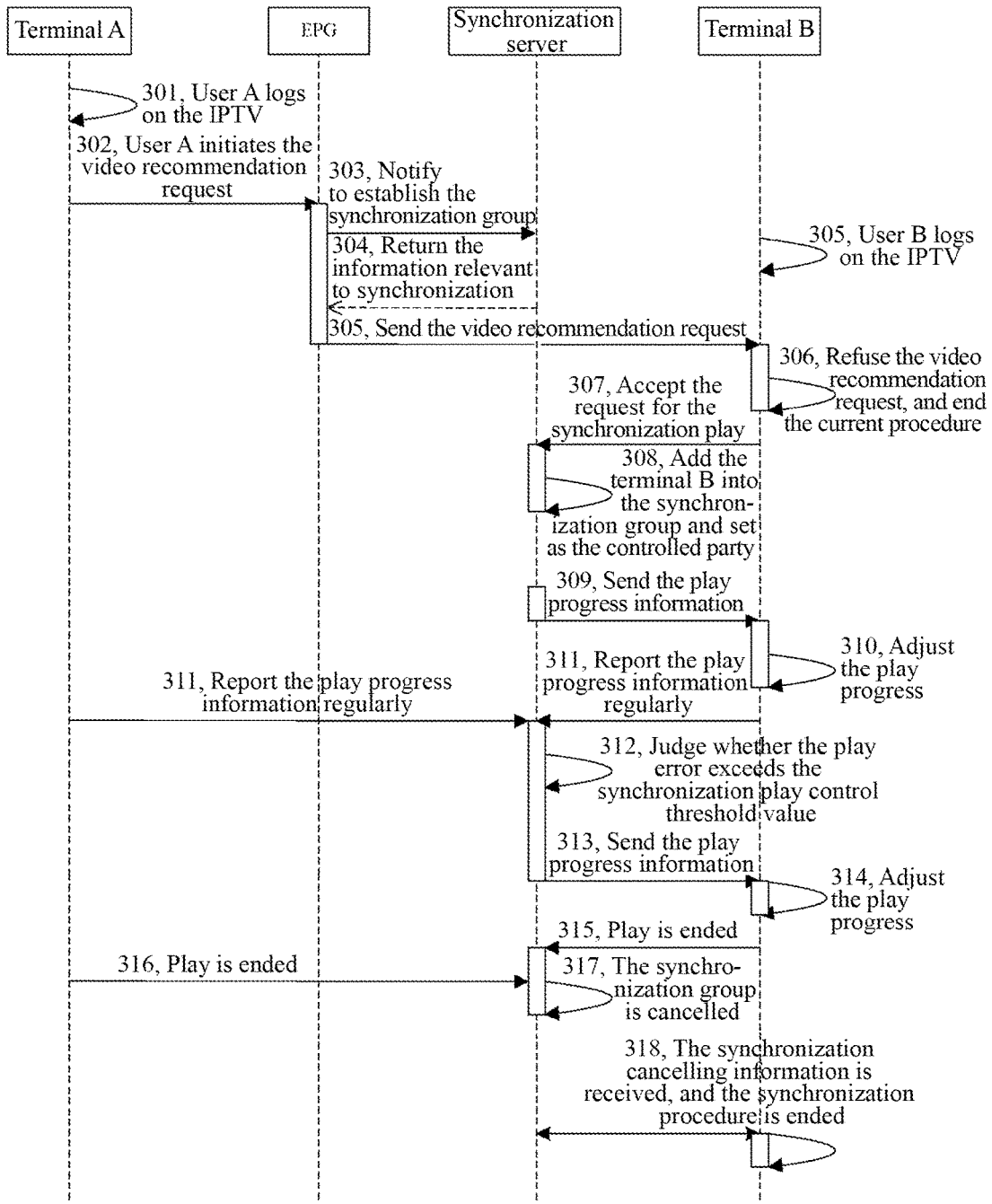
FIG. 3 is a specific realization flow chart of play synchronization control in a video recommendation service according to an embodiment of the present document.

In the present embodiment, the specific implementation procedure of the play synchronization control in the video recommendation service is shown in FIG. 3, including the following steps.

In step 301: the terminal A logs on the IPTV system, obtains the video flow, and plays the video to the user.

In step 302: the terminal A initiates, based on the configuration of the user, the video recommendation request to another user terminal B during the process of playing the video.

Here, the video recommendation request includes the information such as the identification of the terminal B, the identification of the recommended video and the current play progress, etc.

In step 303: the EPG receives the video recommendation request sent by the terminal A, notifies the synchronization server to establish the synchronization group, and includes the information such as the identification of the terminal A as the recommending party in the video recommendation request, the identification of the recommended video and the current play progress, etc. in the notification.

In step 304: the synchronization server receives the notification sent by the EPG, establishes one synchronization group taking the terminal A as the controlling party locally, and the synchronization group includes the information such as the identification of the synchronization group itself, the identification of the controlling party terminal, the identification of the recommended video and the current play progress, etc.; after the synchronization server establishes the synchronization group, the relevant information of the synchronization group is returned back to the EPG.

In step 305: after the terminal B logs on the IPTV system through the EPG, the EPG sends the video recommendation request to the terminal B, and the video recommendation request carries the information relevant to the synchronization group returned by the synchronization server.

In step 306: the terminal B receives the video recommendation request sent by the EPG, refuses the video recommendation request based on the configuration of the user, and finishes the current procedure.

In the practical application, after receiving the video recommendation request, the terminal B can prompt the user whether to accept the video recommendation request, such as, prompting "whether to receive the recommended video", and the user can operate on the terminal B according to the prompt (such as, selecting the function key of accepting or refusing, etc.). The terminal B refuses the video recommendation request when the user B selects to refuse, and finishes the current procedure. When the user B selects to accept, the terminal B accepts the video recommendation request.

In step 307: the terminal station B accepts the video recommendation request, and sends the request for accepting the synchronization play to the synchronization server.

Here, when the user B selects to accept, the terminal B accepts the video recommendation request. Later, the terminal B can also prompt the user whether to accept the synchronization play of the video, and returns an acceptance response to the synchronization server when the user selects to accept the synchronization play of the video; otherwise, the recommended video synchronization procedure is finished and the free watching mode is entered.

In step 308: the synchronization server receives the request for accepting the synchronization play sent by the terminal B, adds the terminal B to the synchronization group taking the terminal A as the controlling party, and sets the terminal B as the controlled party.

Specifically, the synchronization server adds the identification of the terminal B and the identification representing the terminal B as the controlled party into the synchronization group taking the terminal A as the controlling party.

In step 309: the synchronization server sends the current play progress information of the terminal A to the terminal B.

In step 310: the terminal B obtains the video flow of the recommended video and plays the recommended video, and adjusts the play progress of the recommended video according to the current play progress information of the terminal A.

Specifically, the terminal B adjusts the play progress of the recommended video to be consistent with the current play progress of the terminal A.

In step 311: the terminal B reports the play progress information of the recommended video to the synchronization server regularly, and the terminal A also reports the play progress information of the recommended video to the synchronization server regularly.

In step 312: the synchronization server compares the play progress of the recommended video at the terminal A with the the play progress at the terminal B, and judges whether the play error between the two exceeds the preset synchronization play control threshold value (which can be configured in advance according to the real requirement, for example, it can be 100 milliseconds); if yes, then step 313 is continued; otherwise, the present step is continued or step 311 is returned.

In step 313: the synchronization server sends the play progress information reported by the terminal A to the terminal B.

In step 314: the terminal station B adjusts the play progress of the recommended video locally according to the play progress information of the recommended video at the terminal A, and makes the play progress of the recommended video locally be consistent with the play progress of the terminal A.

In step 315: the terminal B finishes the play of the recommended video or logs out the IPTV system voluntarily, the synchronization watching procedure of the terminal B is ended, and the video play of the controlling party terminal A and the information relevant to the synchronization group is not influenced.

In step 316: the terminal A finishes the play of the recommended video, and sends the indication information of the play completion to the synchronization server.

In step 317: the synchronization server receives the indication information of the play completion of the terminal A, cancels the corresponding synchronization group locally, that is to say, to delete the information relevant to the synchronization group taking the terminal A as the controlling party locally, and the synchronization control is finished.

In step 318: when the terminal B reports the play progress information to the synchronization server next time, the synchronization server returns the cancelling information of the synchronization group, the system can prompt whether to continue playing the video, for example, it prompts "the synchronization control is already ended, whether to continue playing the video"; if the user selects "yes", then the terminal B continues playing the video and is not controlled synchronously again; if the user selects "no", then the terminal B finishes the video play.

In the above-mentioned procedures, the play progress information can include the identification of the recommended video, the video play time point, the system timestamp, the synchronization system information and other attribute information (selectable), as shown in Table 1 specifically.

TABLE 1

| Identification of recommended video | Video play time point | System timestamp | Synchronization system information | Other attribute information (selectable) |
| --- | --- | --- | --- | --- |

Wherein, the "video play time point" identifies the current play time point of the recommended video when the terminal reports to the synchronization server, or the play time point required to be adjusted by the indication when the synchronization server sends to the terminal; the "system timestamp" identifies the current system time snapshot when reporting the play progress information; and the "synchronous system information" identifies the attribution synchronization system information of the controlling party, such as, the identification of the synchronization group, etc., and the controlled party can select whether to add into the synchronization group or not according to the "synchronous system information".

The synchronization server can calculate according to the "video play time point" and the "system timestamp" in the play progress information and the current system time and obtain the current play progress of the terminal A and the terminal B for playing the recommended video respectively, where the calculation is specifically as follows: the current play progress=the video play time point+the current system time−the system timestamp, and then the play error between the terminal A and the terminal B is obtained through the difference of the current play progresses of the terminal A and the terminal B. When sending the play progress information to the terminal B, the synchronization server regards the calculated current play progress of the terminal A as the "video play time point" and includes it in the play progress information; when the terminal B receives the play progress information sent by the synchronization server, it can calculate the current play progress of the terminal A on the basis of the above-mentioned method, and then adjusts the local play progress of the recommended video to be consistent with the current play progress of the terminal A.

In the above-mentioned scheme, the play progress information includes the "current time stamp of the system", which can avoid influencing the precision of the synchronization play because of the network delay in the reporting and sending processes.

In the above-mentioned procedures, the information about the synchronization group can include the identification of the synchronization group itself, the identification of the controlling party terminal, the identification of the recommended video, the current play progress and other attribute information (selectable), as shown in Table 2 specifically.

TABLE 2

| Identification of the synchronization group itself | Identification of the controlling party terminal | Identification of the recommended video | Current play progress | Other attribute information (selectable) |
| --- | --- | --- | --- | --- |

Wherein, the "current play progress" represents the play progress information reported by the controlling party terminal recently.

Wherein, the "other attribute information (selectable)" can include the information, such as, the identification of the user belonged to the synchronization group, the synchronization error threshold value, etc., which facilitates the further expansion of the system.

It should be illustrated that in the synchronization control process of the video play, the operations of forward and backward are relatively more complicated. In this kind of operation process, the terminal does not report the play progress information, but reports the play progress information to the synchronization server after the forward or backward operation is ended, thus simplifying the control method of the forward and backward. When the controlled party terminal finishes the video play by itself, the synchronization control of the video play is correspondingly ended.

It should be illustrated that the above-mentioned terminal A or terminal B can be specifically the terminal device such as the set-box, etc. in the IPTV system, and the above-mentioned controlled party terminal B can be multiple, which add into the synchronization group of the controlling party terminal A at the same time, to realize the synchronization watching; here, the specific realization procedure of the multiple controlled party terminal is similar to the above-mentioned procedure, and will not go into details again.

The above description is only the preferable embodiment of the present document, while is not used for limiting the protective scope of the present document.

I claim:

1. A method for play synchronization control in a video recommendation service, comprising:
   receiving, by a synchronization server, play progress information reported in real time by a controlling party terminal and a controlled party terminal during a play process of a recommended video, wherein, the play progress information comprises an identification of the recommended video, a video play time point, and a system timestamp configured to identify a system time when the play progress information is sent;
   calculating, by the synchronization server, a current play time point for the recommended video of the controlling party terminal according to the play progress information of the controlling party terminal, wherein the current play time point=the video play time point+a current system time−the system timestamp, which avoids influencing precision of the synchronization play because of network delay in reporting and sending processes;
   comparing, by the synchronization server, a play error between a video play time point of the controlling party terminal and a video play time point of the controlled party terminal with a preset synchronization play control threshold value;
   sending, by the synchronization server, the play progress information which contains the current video play time point for the recommended video of the controlling party terminal to the controlled party terminal when determining that the play error exceeds the preset synchronization play control threshold value;
   receiving, by the controlled party terminal, the play progress information sent by the synchronization server, and adjusting a play progress of the recommended video at the current play time point for the recommended video of the controlling party.

2. The method for play synchronization control in a video recommendation service according to claim 1, before the synchronization server receiving play progress information reported in real time by a controlling party terminal and a controlled party terminal during a play process of a recommended video, further comprising:
   establishing, by the synchronization server, a synchronization group including the controlling party terminal and the controlled party terminal, and sending information about the synchronization group to the controlling party terminal and the controlled party terminal.

3. The method for play synchronization control in a video recommendation service according to claim 1, wherein, the step of comparing, by the synchronization server, a play error between a video play time point of the controlling party terminal and a video play time point of the controlled party terminal with a preset synchronization play control threshold value comprises:
calculating according to the play progress information reported by the controlled party terminal to obtain the current play time point for the recommended video of the controlled party terminal;
obtaining the play error between the controlling party terminal and the controlled party terminal from a difference between the current play time point for the recommended video of the controlling party terminal and the current play time point for the recommended video of the controlled party terminal; and
comparing the play error between the controlling party terminal and the controlled party terminal with the preset synchronization play control threshold value, and judging whether the play error between the controlling party terminal and the controlled party terminal exceeds the preset synchronization play control threshold value.

4. The method for play synchronization control in a video recommendation service according to claim 1, wherein, the play progress information further comprises: a synchronization group identification; and
wherein, the video play time point is configured to identify the current play time point of the recommended video when the controlling party terminal or the controlled party terminal reports the play progress information, or configured to identify the current play time point for the recommended video of the controlling party terminal when the play progress information is sent to the controlled party terminal.

5. The method for play synchronization control in a video recommendation service according to claim 1, wherein, the controlled party terminal calculating according to the play progress information to obtain a current play progress of a controlling party terminal and adjusting a play progress of a recommended video to be consistent with a current play progress of the controlling party comprises:
calculating, by the controlled party terminal, according to a video play time point and a system timestamp in the play progress information, to obtain the current play time point for the recommended video of the controlling party terminal, and
adjusting a local play progress of the recommended video to the current play time point for the recommended video of the controlling party terminal.

6. The method for play synchronization control in a video recommendation service according to claim 1, before the controlling party terminal reports in real time the play progress information to the synchronization server, further comprising:
receiving, by the controlling party terminal, information about a synchronization group sent by the synchronization server after the synchronization server establishing the synchronization group which contains the controlling party terminal and a controlled party terminal, sending a video recommendation request to the controlled party terminal, and carrying the information about the synchronization group in the video recommendation request.

7. A synchronization server, comprising a receiving unit, a sending unit and a judgment unit; wherein,
the receiving unit receives play progress information reported in real time by a controlling party terminal and a controlled party terminal during a play process of a recommended video, wherein, the play progress information comprises an identification of the recommended video, a video play time point, and a system timestamp configured to identify a system time when the play progress information is sent; and
the sending unit calculates a current play time point for the recommended video of the controlling party terminal according to the play progress information of the controlling party terminal, wherein the current play time point=the video play time point+a current system time−the system timestamp, which avoids influencing precision of the synchronization play because of network delay in reporting and sending processes; and when receiving a notification of determining that a play error exceeds a preset synchronization play control threshold value from the judgment unit, sends the play progress information which contains the current video play time point for the recommended video of the controlling party terminal to the controlled party terminal to adjust a play progress of the recommended video at the current play time point for the recommended video of the controlling party; and
the judgment unit compares the play error between a video play time point of the controlling party terminal and a video play time point of the controlled party terminal with the preset synchronization play control threshold value, and sends the notification to the sending unit.

8. The synchronization server according to claim 7, wherein, the play progress information further comprises: a synchronization group identification; and
wherein, the video play time point identifies the current play time point of the recommended video when the controlling party terminal or the controlled party terminal reports the play progress information, or identifies the current play time point for the recommended video of the controlling party terminal when the play progress information is sent to the controlled party terminal.

9. The synchronization server according to claim 7, wherein, the judgment unit
calculates according to the play progress information of the controlling party terminal received by the receiving unit to obtain the current play time point for the recommended video of the controlling party terminal;
calculates according to the play progress information of the controlled party terminal received by the receiving unit to obtain the current play time point for the recommended video of the controlled party terminal;
obtains the play error between the controlling party terminal and the controlled party terminal from a difference between the current play time point for the recommended video of the controlling party terminal and the current play time point for the recommended video of the controlled party terminal; and
compares the play error between the controlling party terminal and the controlled party terminal with the preset synchronization play control threshold value, to judge whether the play error between the controlling party terminal and the controlled party terminal exceeds the preset synchronization play control threshold value.

10. The synchronization server according to claim 7, further comprising: an establishment unit, which establishes a synchronization group including the controlling party terminal and the controlled party terminal, and sends information about the synchronization group to the controlling party terminal and the controlled party terminal.

11. A party terminal, comprising a processor and a storage device storing computer executable instructions that when executed by the processor cause the processor to perform the steps of:
when served as a controlled party terminal, reporting in real time play progress information comprising an identification of the recommended video, a video play time point, and a system timestamp configured to identify a system time when the play progress information is sent to a synchronization server during a play process of a recommended video; and receiving play progress information sent by the synchronization server, adjusting a play progress of the recommended video at a current play time point for the recommended video of the controlling party; and
when served as a controlling party terminal, reporting play progress information in real time to a synchronization server during a play process of a recommended video, wherein, the play progress information comprises an identification of the recommended video, a video play time point, and a system timestamp configured to identify a system time when the play progress information is sent;
wherein the current play time point=the video play time point+a current system time−the system timestamp, which avoids influencing precision of the synchronization play because of network delay in reporting and sending processes.

12. The party terminal according to claim 11, wherein, the play progress information further comprises: a synchronization group identification; and
wherein, the video play time point is configured to identify the current play time point of the recommended video when the controlling party terminal or the controlled party terminal reports the play progress information, or configured to identify the current play time point for the recommended video of the controlling party terminal when the play progress information is sent to the controlled party terminal.

13. The party terminal according to claim 11, the processor further performing the steps of: when served as the controlling party terminal, receiving information about a synchronization group sent by the synchronization server after the synchronization server establishes the synchronization group which contains the controlling party terminal and the controlled party terminal, sending a video recommendation request to the controlled party terminal, and carrying the information about the synchronization group in the video recommendation request.

* * * * *